United States Patent [19]

Braggins

[11] 3,985,213
[45] Oct. 12, 1976

[54] LOAD RELEASE DEVICES
[75] Inventor: George Roderick Braggins, Virginia Water, England
[73] Assignee: The Wellman Bibby Company Limited, England
[22] Filed: Nov. 7, 1974
[21] Appl. No.: 521,818

[52] U.S. Cl. .................................. 192/56 R; 64/29
[51] Int. Cl.² ........................................... F16D 7/02
[58] Field of Search ................ 192/56 R; 64/29, 28

[56] References Cited
UNITED STATES PATENTS

| | | | |
|---|---|---|---|
| 998,615 | 7/1911 | Huneke | 192/56 |
| 2,045,572 | 6/1936 | Dow | 192/56 |
| 2,780,332 | 2/1957 | Stevens | 192/56 |
| 2,837,190 | 6/1958 | Blakeslee | 192/56 |
| 3,080,029 | 3/1963 | Stober | 192/56 |

Primary Examiner—Samuel Scott
Assistant Examiner—Randall Heald
Attorney, Agent, or Firm—Woodcock Washburn Kurtz & Mackiewicz

[57] ABSTRACT

A resettable release device to replace a shear pin connection between two members comprises a drive ball yieldably held in a seating in one of the members by a plunger slidable in a housing in the other member. The drive ball is located in a bore in the housing. The plunger has an annular shoulder against which a crowded ring of detent balls is held by two ball control rings resiliently urged towards each other. On overload, the drive ball moves out of its seating by pushing the detent balls up over the shoulder, forcing ball control rings apart. Pushing the plunger back to its original position resets the device.

8 Claims, 2 Drawing Figures

LOAD RELEASE DEVICES

BACKGROUND OF THE INVENTION

This invention relates to load-release devices of the kind whereby a load force or torque transmitted by the device is released when the load force or torque exceeds some preset value.

For this purpose, it is conventional to use shear pins each having one end closely fitted in one of the two members and the other end closely fitted in the other member. The shear pins shear when the load to be transmitted by them exceeds the maximum value determined by their shear strength.

Such shear pins have to be very accurately made if their performance is to be at all consistant and predictable. They have to be carefully fitted into finely finished bores in the two members. Whenever the pins shear in response to overload, the apparatus has to be dismantled, at least to some extent, and new pins carefully fitted by hand. This work must be carried out by a skilled fitter and is time-consuming and thus expensive not only in respect of the fitter's time but also in respect of the corresponding period of time during which the equipment driven through the two members is out of service. Furthermore, there may be a risk that fragments of the shear pins are ejected when they shear on overload. Any steps taken to minimise this risk, for example by the use of additional guards or housings entail further work and time in dismantling and reassembly each time the pins are replaced.

Finally, it is necessary to ensure that an adequate stock of the correct replacement shear pins is available at all times even though they may be very seldom required.

PRIOR ART

British Patent Specification No. 1,238,936 describes a torque limiting device in the form of a jaw clutch which automatically disengages on overload and remains disengaged until reset.

OBJECT OF THE INVENTION

An object of the invention is to provide a resettable device as a replacement for a shear pin.

Other objects and advantages of the invention will become apparent from the following description, taken in conjunction with the drawings.

BRIEF DESCRIPTION OF THE DRAWINGS

In the drawings:

In the drawings, FIG. 1 shows a release unit while is able to transmit forces between two members in a direction transverse to a line joining them but which releases, to disconnect them, when the force between them exceeds a preset value.

In FIG. 1, 31 and 32 represent the said two members able, when not locked together, to move relative to one another in mutually parallel paths as indicated by the arrows A. A release unit 33 is conveniently mounted, by screw threads on its housing or by other means, on the member 31 with its axis substantially normal to the direction of relative movement of the members 31 and 32. When the members 31 and 32 are stationary relative to one another, a counter-sunk seating 34 formed in an insert 4 in the member 32 registers with the housing 33 to retain between them a ball 35 which is maintained in engagement with the seating 34 by the counter-sunk end of a grub screw 38 mounted in a release spindle 36 slidable in a bore in the housing 33. The outer surface of the spindle 36 has an inclined step 29 leading into a reduced-diameter portion 28 at the end of the spindle remote from the ball 35. A crowded ring of balls 27 is held in contact with the step 29 by inclined faces of two ball control rings 26 and 25. The ball control ring 26 is externally screw-threaded and engaged in internal threads in the housing 33. Any force in the direction of the arrows A tending to move member 31 relative to member 32 presses the ball 35 against the spindle 36 and its screw 38 and when this pressure exceeds the initial "break-out" force exerted by a stack of belleville washers 39 on the ball control ring 27, the ring of balls 27 are forced up the step 29 and the ball 35 snaps completely out of engagement with its seating 34 whereupon members 31 and 32 cease to be connected in a driving sense and may move independently. The value of the "break-out" force may be adjusted by turning the ring 26 relative to the housing 33 with a wrench.

Figure 1:
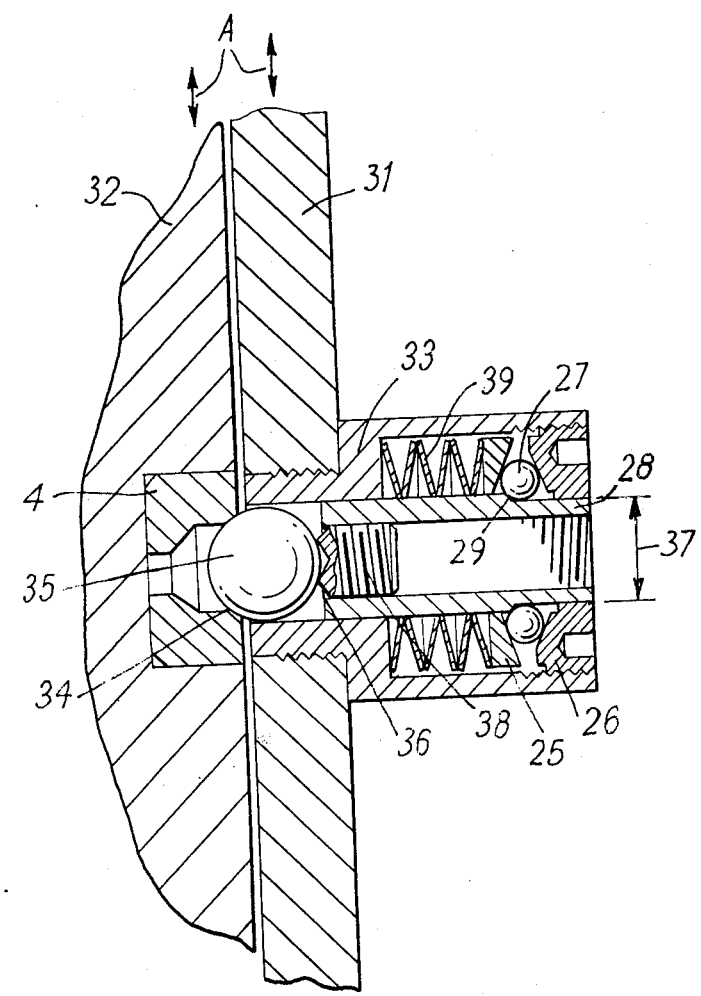
FIG. 1 is a longitudinal sectional view of a relief unit acting as a replacement for a shear pin in preventing relative movement between two members until a force tending to cause that such movement exceeds a predetermined value.

The assembly thus acts as a shear pin but re-engagement can be effected by realigning seating 34 with release unit housing 33 and pressing the other end 37 of the spindle 36 to return ball 35 to engage its seating 34 and reset the release unit.

Backlash between the ball 35 and members 4 and 38 may be taken up by adjustment of the grub screw 38 by means of a tool extending through the centre of spindle 36.

The members 31 and 32 could for example be of circular (or any other) configuration mounted respectively on coaxial driving and driven shafts; a plurality of the release units may be pitched about the shaft axis to transmit torque from one shaft to the other and to disconnect the shafts from each other when torque between them reaches a selected value.

The device could operate in a similar manner when the members 31 and 32 are substantially concentric cylinders, the centre line of the release unit 33 then being substantially radially disposed relative to the common axis of the two members 31 and 32.

Figure 2:
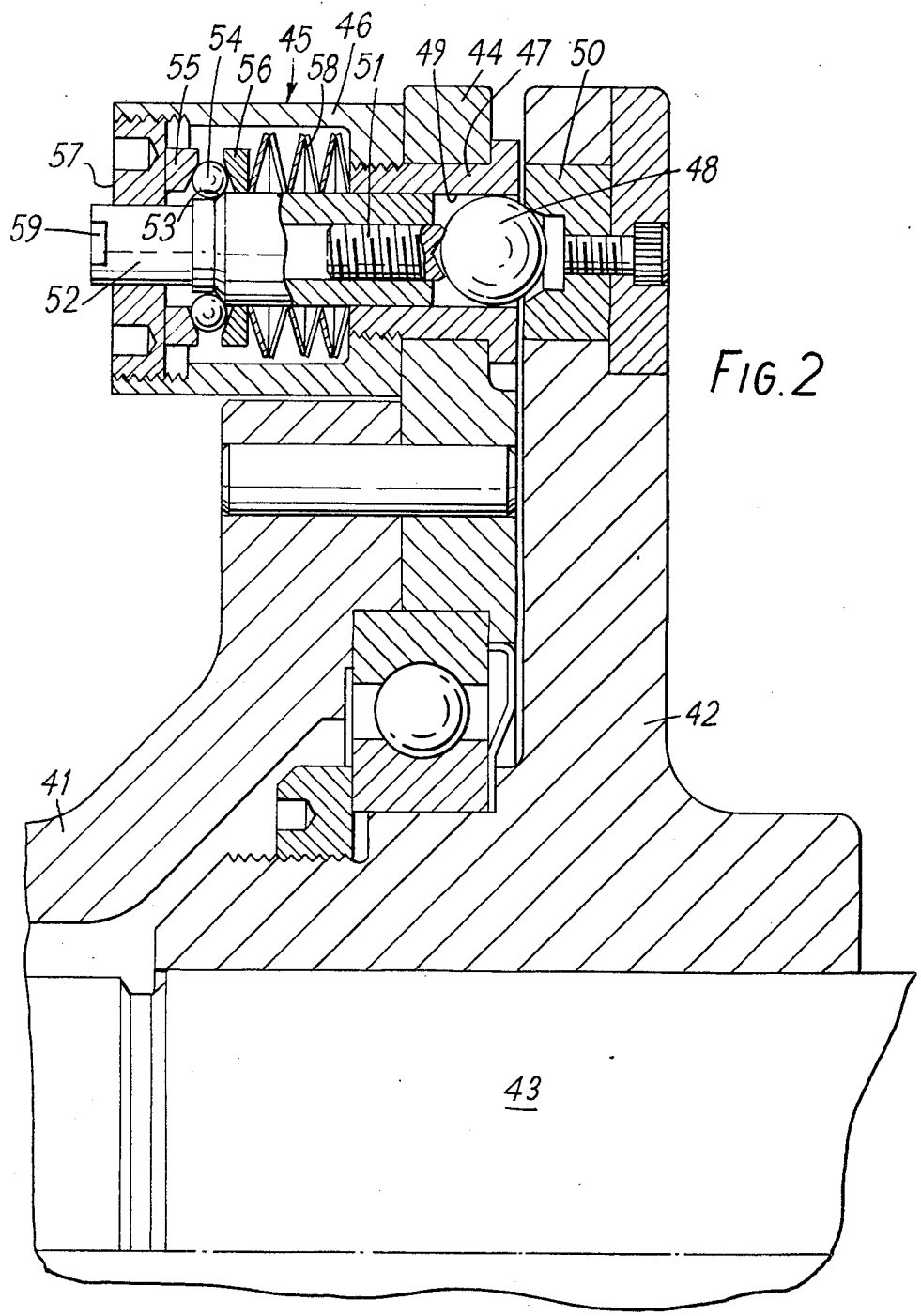
FIG. 2 is an axial sectional view through a torque limiting device which includes a plurality of a modified form of the relief unit shown in FIG. 1.

FIG. 2 shows a torque-limiting device in which a plurality of shear pins have been replaced by a corresponding plurality of relief unis similar to those shown in FIG. 1.

In the FIG. 2 construction, a sleeve 41 is arranged to transmit to a flange 42 torques up to a predetermined value. The flange 42 is secured to an output shaft 43. The sleeve 41 carries a flange 44 in which a set of release devices 45 are mounted near the outer periphery of the flange.

Each release unit 45 replaces a shear pin. It comprises a housing formed in two parts, 46, 47 which are connected together by screw threads. The housing portion 47 forms in effect a hollow bolt and passes through an aperture in the flange 44. A ball 48 is a sliding fit in the bore 49 in the hollow member 47 and co-operates with the seating 50 carried by the flange 42.

The ball 48 is normally retained in its seating 50 by the counter-sunk end of a grub screw 51 engaged in the threaded interior of a plunger 52 formed with an inclined step 53 against which a set of balls 54 are held by inclined faces of two ball-control rings 55 and 56 which are free to be located radially by the ball 54 and are confined axially between an adjusting ring 57 screwed into an end of the housing portion 46 and a stack of belleville washers 58 compressed between the ring 56 and the end of the housing portion 47.

Each of the release units 45 and the embodiment of FIG. 2 operates in the same manner as that shown in FIG. 1. Thus, if a machine driven by the shaft 43 should jam, each of the units 45 will release and no torque will then be transmitted between the flanges 46 and 42.

The embodiment of FIG. 2 can be re-engaged by directly aligning the flanges 42 and 46 and pushing the plungers 52 to the right to re-engage the balls 48 with their seatings 50.

When setting up the torque transmitting device shown in FIG. 2, the grub screw 51 may be adjusted into light engagement with the ball 48 when the latter is in contact with its seating 50, thereby avoiding any backlash or chatter. The correct adjustment of the grub screw 51 can be retained by means of a locking medium on its threads, such as shellac or an appropriate availabe under the Trade Mark "LOCTITE". Rotation of the spindle 52 during adjustment of either the grub screw 51 or the spring tension adjusting ring 57 may be prevented by applying a spanner to flex 59 on the exposed end of the plunger 52. The desired setting of the ring 57 may be retained in the same way as for the grub screw 51.

In all the embodiments described above, it may be found desirable to coat the relatively movable surfaces of the release units with a lubricant containing molybenum disulphide.

It will be understood by those skilled in the art that many apparently wide ranging changes may be made in the embodiments described above without departing from the scope of the invention.

I claim:

1. In a torque-limiting coupling comprising first and second rotary members mounted for rotation about a common axis and at least one release device spaced from said axis and interconnecting said first and second rotary members, the improvement in which said release device comprises a housing carried by said first member, plunger means mounted for movement in said housing between a projecting position and a retracted position, a seating in said second member for cooperation with said plunger means in the projecting position thereof, cooperating portions of said plunger means and said seating being shaped to cam said plunger means towards said retracted position on relative lateral movement therebetween during relative rotation of said rotary members, said plunger means having shoulder means facing away from said seating, rolling means in contact with said shoulder means, and means yieldably holding said rolling means up to said shoulder means.

2. The device of claim 1 in which said plunger means comprises a ball adapted to seat in said seating and a spindle slidable in said housing and being formed with said shoulder means.

3. The device of claim 2 in which said spindle has an adjustable ball-contacting element whereby to take up play between said ball and said seating.

4. The device of claim 1 in which said rolling means comprise a set of balls which are yieldably held in contact with said shoulder means by two annular members which are resiliently urged towards each other, said annular members having mutually inclined ball contacting faces whereby to wedge said balls towards the axis of said annular members.

5. The release device of claim 4, in which said annular members are radially floating so that their radial position is determined by the balls.

6. The release device of claim 4 in which said shoulder means is inclined to the axis of the second member.

7. The device of claim 4 in which said plunger means comprises a ball adapted to seat in said seating and a spindle slidable in said housing and being formed with said shoulder means.

8. The device of claim 7 in which said spindle has an adjustable ball-contacting element whereby to take up play between said ball and said seating.

* * * * *